Oct. 4, 1938.  R. L. DAY  2,131,796
FERTILIZING SPRINKLER
Filed Oct. 30, 1936  2 Sheets—Sheet 1
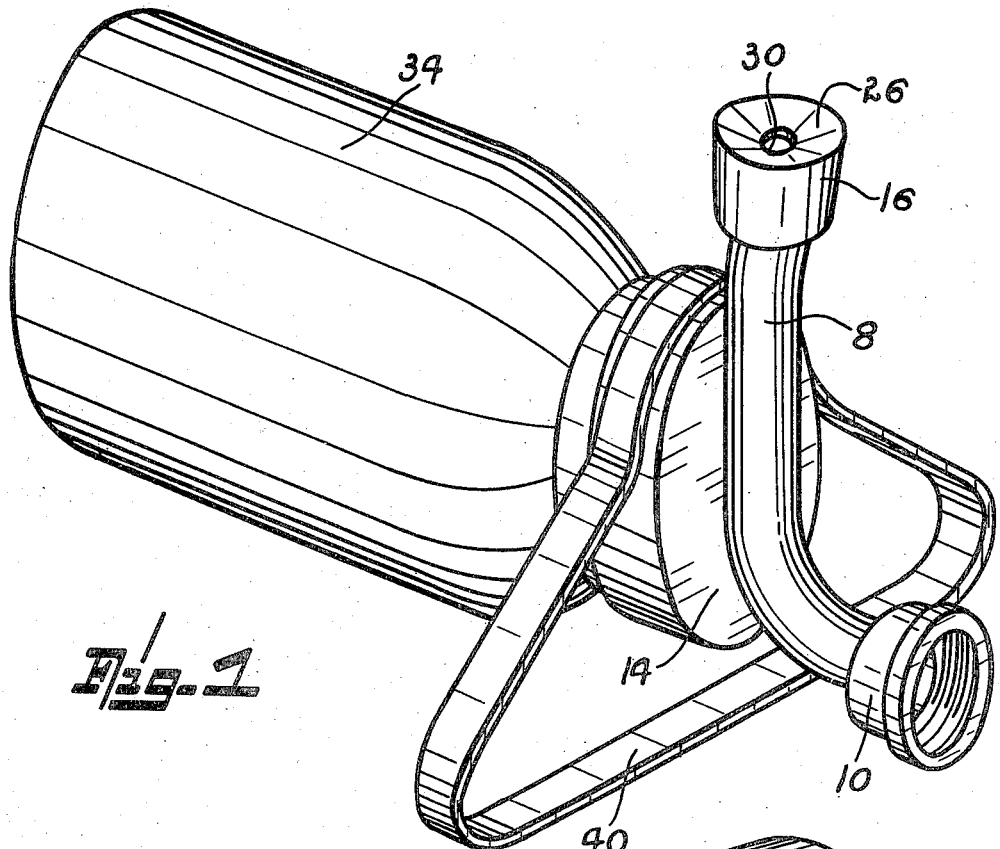
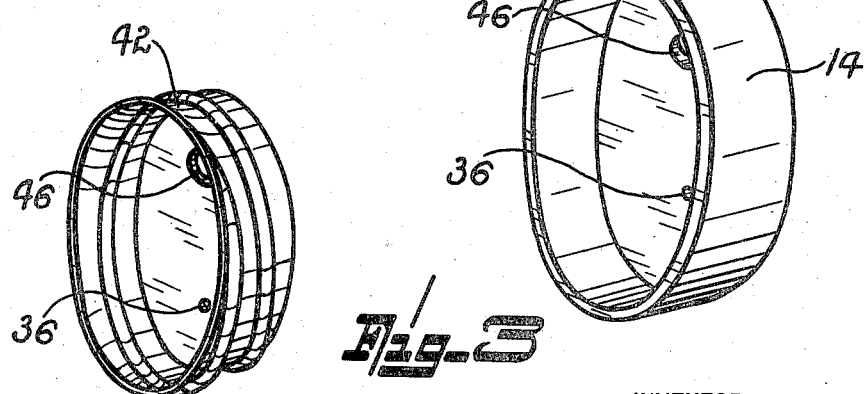

Oct. 4, 1938.                R. L. DAY                 2,131,796
                      FERTILIZING SPRINKLER
                      Filed Oct. 30, 1936            2 Sheets-Sheet 2
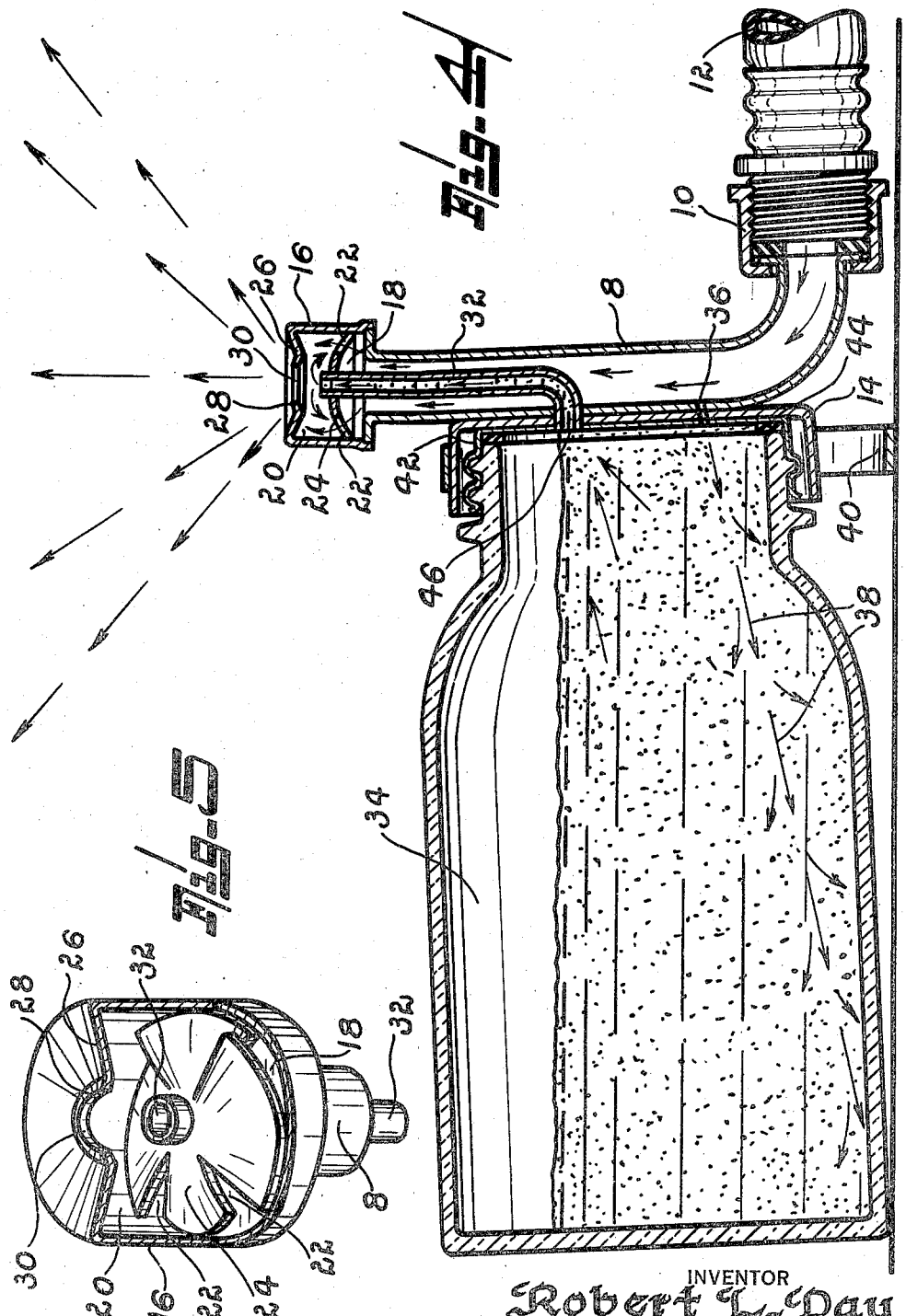
INVENTOR
Robert L. Day
BY
Smith & Tuck
ATTORNEYS Patented Oct. 4, 1938

2,131,796

UNITED STATES PATENT OFFICE 2,131,796

FERTILIZING SPRINKLER

Robert L. Day, Seattle, Wash.

Application October 30, 1936, Serial No. 108,469

1 Claim. (Cl. 299—84)

My present invention relates to that general class of devices used in distributing fertilizer, and more particularly it relates to a device which is intended for mixing fertilizer with water under pressure, to the end that an even distribution of the fertilizer may be made. I, therefore, have termed my device a fertilizing sprinkler.

My present sprinkler is intended for connection with a hose, delivering water under pressure, as is common in sprinkling. A portion of the water is by-passed into a container holding a soluble fertilizer. The dissolved fertilizer is then withdrawn from the container by a combination of pressure and siphon action and joins the main stream of water which is being delivered from the nozzle as a spray. In this manner a small amount of fertilizer is distributed by a relatively large amount of water, so that a very even distribution of the fertilizer can be assured and further the fertilizer cannot be deposited in sufficient concentration in any one spot to cause any danger to the plant life as is so common with chemical fertilizers if they are scattered by any usual means.

To attain satisfactory results requires a careful study of the problem and an accurate balancing, in the design, between the various parts of the device. This it is believed has been accomplished in my present invention.

Other and more specific objects will be apparent from the following description taken in connection with the accompanying drawings, wherein Figure 1 is a perspective view showing my device as it is set up for operation with the exception that no connecting hose is shown.

Figure 2 is a perspective showing the inner, flexible cap used with my device.

Figure 3 is the outer rigid cap used with my device.

Figure 4 is a longitudinal, sectional view of my device as it is employed in use.

Figure 5 is a perspective view partly broken away and shown, in section, to more fully illustrate the construction of the delivery nozzle.

Referring to the drawings, throughout which like reference characters indicate like parts, 8 designates the main water tube used with my device. This is provided with the connecting union member 10, coupling my device to the usual garden hose 12. Tube 8 is supported from the rigid outer cap 14 to which it is brazed, soldered, or otherwise fixedly secured. Secured to the end of water tube 8 is the delivery, or spray nozzle, 16. The exact construction of this nozzle will be best understood from a study of Figures 4 and 5. The water delivered by tube 8 is fed into the lower chamber 18 of the nozzle. From here it is passed into the upper chamber 20 through openings 22 in the baffle, or separating plate, 24. This plate is cut and bent so that the water, in passing from the under chamber to the upper chamber, is delivered with a whirling motion which, in itself, is quite common with spray devices. To then assist in projecting the whirling stream of water in a spray, the top of the nozzle is formed with an inwardly inclined portion 26 which terminates in an upward, or outwardly inclined portion, 28, immediately surrounding the discharge opening 30.

Supported by cap 14, tube 8, and baffle plate 24, is the fertilizer siphon tube 32. This extends out beyond plate 24, coaxially disposed with opening 30, and communicates with the interior of the fertilizer container 34. This container is, as a matter of convenience, shown as a glass jar of the type normally used for fruit preserving. It will be apparent, however, that glass is not an essential material although it does add to the convenience in operation as it can be readily seen when the fertilizer has been entirely used and, further, as used the jar is not subjected to any appreciable pressure.

There is a second opening into container 34; namely, the water inlet opening 36 which connects the main source of water supply, in tube 8, to the jar. This opening should be disposed substantially as indicated in Figure 4 so that water going through the relatively small opening 36 will be directed preferably toward the bottom of the container so that the water will take the general course of arrows 38 and thus more fully agitate the fertilizer to be distributed.

Secured to the outer cap 14 is a stand member 40. This is so arranged as to elevate the attachment end of container 34. This serves two purposes; it provides clearance for hose 12 and the attaching union member 10 and also provides for the collection of the last bit of fertilizer into the extreme low corner of the jar were it gravitates. It is further aided in collecting there by the stream of water projected through opening 36.

Due to the fact that the average glass jar cannot be economically molded to an exact size, I find it most desirable to employ inside of the rather heavy, fixed outer cap 14, an inner flexible cap member 42. This cap is suitably deformed to engage the securing lugs on the jar, or in case threads are molded on the edge of the jar, the caps should, of course, have coacting threads. A resilient gasket 44 is employed to insure a seal at the end of the jar. In order to function as indicated the inner cap 42 should be secured to the outer cap 14 only on its circular end portion leaving the threaded engaging flange free so that it can be slightly distorted and thus be fitted to any ordinary jar.

*Method of operation*

In operating my device it is first, of course, necessary to fill, or at least partially fill, container 34 with a soluble fertilizer. The spray unit as a whole is screwed, or otherwise secured, to the end of the container and the water under pressure is connected thereto. The bulk of this water passes out through openings 22 in baffle 24 and out the sprinkler head 16, as a whirling spray. There is, of course, a substantial resistance in the sprinkler head itself, consequently a good deal of pressure remains in tube 8. This forces water through the relatively small opening 36 into the bottom of container 34. This continues until the jar is filled with water to a point slightly above the intake end 46 of tube 32.

The water from container 34, which has dissolved in it a certain amount of the fertilizer, is forced up through tube 32 into the upper portion 20 of the nozzle 16, where it tends to fall on the curved baffle plate 24. Its normal action is to follow down the curved surfaces until it reaches the lips provided by openings 22; here the rush of clear water picks up the fertilizer laden water and carries it out through the nozzle head. It, of course, is one of the requirements of such a sprinkling device that the fertilizer be gradually distributed and to prevent any large amount being drawn out opening 36 should be kept relatively small. For a quart size container this can be number 70 drill size, if three-sixteenths of an inch outside diameter tubing is used for tube 32. Naturally, as any liquid drawn out of tube 32 must be replaced in the container by a similar amount of liquid, this restriction on the ingoing liquid prevents a rapid discharge from the container and it is this arrangement that makes my device practical in operation.

Owing to the whirling spray action of head 16 little, if any, suction or siphoning effect is noted in tube 32. A careful study of the action indicates that the water level in container 34 rises above outlet 46 creating an air dome in the upper part of the jar substantially as indicated in Figure 4. As additional water enters through hole 36 the effect is to force fertilizer laden water up through tube 32 to head 16. The pressure thus built up is only a fraction of a pound and not sufficient to endanger the glass jar or to cause any breakage around cover 42. It is essential to provide a free opening, as through tube 32, that has many times the area of the inlet 36. The ratio given above is not critical but has proved very satisfactory where normal water pressure, not to exceed 60 pounds a square inch, is used.

The foregoing description and the accompanying drawings are believed to clearly disclose a preferred embodiment of my invention but it will be understood that this disclosure is merely illustrative and that such changes in the invention may be made as are fairly within the scope and spirit of the following claim:

Having thus fully described my invention, what I claim as new and desire to secure by Letters Patent is:—

A liquid receptacle having a sealed closure and means for detachably securing an open-end of the receptacle in the closure, an upright exterior solution-conveyor pipe mounted in the closure and open to the interior of the receptacle adjacent the top thereof, a water tube rigid with the closure, enclosing the pipe and having a downwardly diverging connection through the lower portion of said closure whereby the water passing through said inlet will be directed toward and along the bottom of said receptacle, a spray-head on the upper end of the tube, a baffle plate in the spray-head forming a lower water chamber and said plate having ports to impart a whirling motion to the fluid issuing from the spray-head, and said pipe having its open discharge end projected through said plate.

ROBERT L. DAY.